United States Patent Office 2,703,752
Patented Mar. 8, 1955

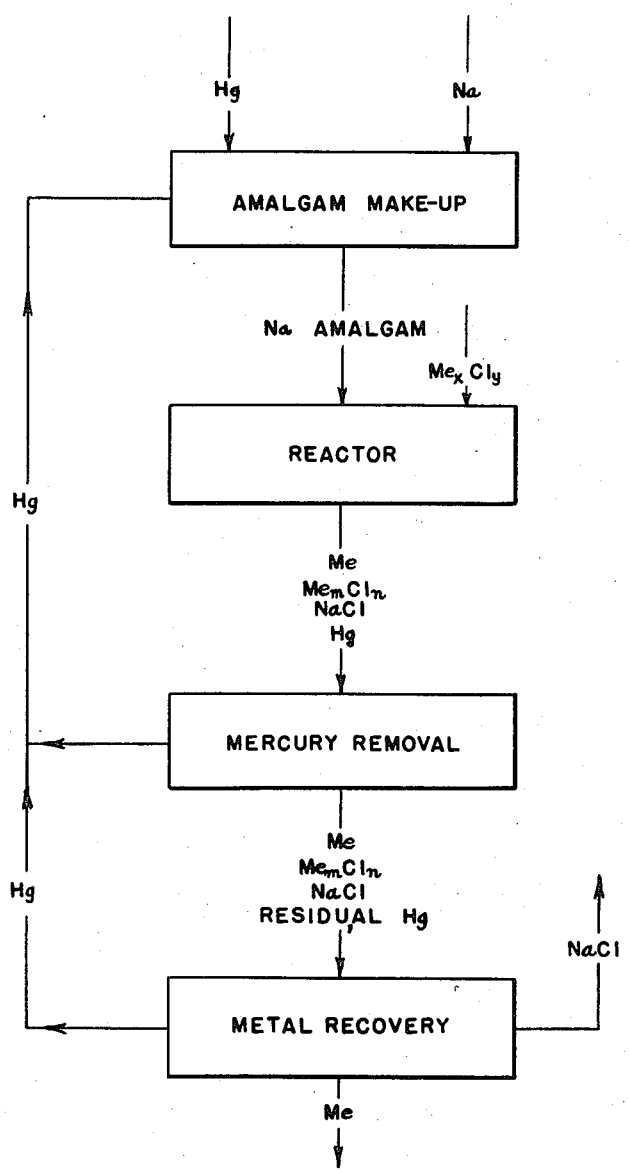

2,703,752

METHOD FOR PRODUCTION OF REFRACTORY METALS

Julian Glasser, La Grange, and Clifford A. Hampel, Homewood, Ill., assignors, by mesne assignments, to Kennecott Copper Corporation, New York, N. Y.

Application January 20, 1951, Serial No. 207,028

11 Claims. (Cl. 75—84)

The present invention relates to a method for the recovery of metals from groups IV-A, V-A and VI-A of the periodic system.

Many metals of the above-mentioned groups would be useful for commercial purposes if their recovery could be made more economical. Particularly, metals such as titanium and zirconium have properties of hot strength, light weight and high corrosion resistance, making them very suitable metals for use in structural materials, such as for engine parts which are subjected to high temperatures in operation.

Many of the metals with which the present invention is concerned are incapable of being reduced by conventional reducing processes, and resort has previously been made to the use of conditions of high temperature, pressures, and the use of higher reactive reducing agents such as metallic sodium and molten magnesium to recover the elemental metals from their compounds. The reduction of these compounds by means of highly reactive metals is handicapped by the cost of the operation due to the high power requirements, the necessity of providing pure reducing metals, and the difficulty in handling the reducing metals. Further, the purity of the metals thus far produced has been limited by the processes used for separation of the elemental metal from reaction mixtures due to the extreme affinity of some of the metals in subdivided form for oxygen, nitrogen, and other gases. Further, when very reactive reducing agents are used, such as metallic sodium, the reaction is uncontrollable in the absence of very high pressures.

An object of the present invention is to provide a method for the recovery of metals from groups IV-A, V-A and VI-A of the periodic system in a high degree of purity.

Another object of the present invention is to provide a controllable method for the reduction of metallic compounds to recover the metals therefrom.

Still another object of the present invention is to provide a process for the recovery of refractory metals without the use of high temperatures and pressures.

Still another object of the invention is to provide a process for the production of pure, metallic refractory metals through the use of inexpensive materials, thereby decreasing the overall cost of recovering the metals.

In the present invention, the refractory metals of the groups IV-A, V-A and VI-A of the periodic system are recovered in crystalline form by the reduction of a halide, preferably a chloride, of the metal with an amalgam of an alkali metal such as sodium or potassium. The reaction product occurring from this reaction is thereupon treated for the recovery of the stable, crystalline metal.

The advantages accruing from the use of an amalgam of an alkali metal as a reducing agent as compared to the use of a solid reducing agent are very distinct. The use of an amalgam gives the process a mobility not possible in processes involving the use of metallic reducing agents such as magnesium or sodium. The temperature and pressure conditions for the reaction are far less stringent than those necessarily employed for a reduction with other metallic reducing agents. The process has the further advantage that intimate contact between the metallic compound to be reduced and the liquid alkali metal amalgam is assured since agitation is made much more convenient.

By accomplishing the reduction of the metal compound in the presence of mercury, several advantages may be realized. First, the amalgam is much more easily handled and carried into the reaction zone than a pure alkali metal reducing agent. In many instances the presence of mercury has been found to deactivate the elemental metal produced in the reduction, thereby enhancing the reaction and lessening the tendency of the metal to become oxidized. In addition, objectionable impurities such as water, oxygen, nitrogen and hydrogen, as well as many metals, are not soluble or occluded in mercury or the amalgam and are thus not introduced into the reaction product during the reduction. Further, heat transfer problems are simplified when an amalgam is used in preference to a normally solid reducing agent. In addition, the vigor of the reaction occurring between the amalgam and the metallic compound is substantially less than that occurring when metallic sodium is used as a reducing agent.

The process of the present invention is particularly applicable to the recovery of metals such as titanium, zirconium, hafnium, and thorium of Group IV-A of the periodic system; vanadium, columbium, and tantalum of group V-A of the periodic system; and chromium, molybdenum, tungsten and uranium of group VI-A of the periodic system. These metals are not appreciably soluble in mercury and do not form stable compounds with mercury. In addition, up to temperatures of 1000° C. the metals are not appreciably soluble in the alkali metal salt such as sodium chloride produced by the reaction. Further, the metals are not soluble or else do not form stable compounds with sodium up to a temperature of about 1000° C. In addition, the vapor pressure of the metals at the boiling point of sodium chloride are very low, thus facilitating the volatilization of sodium chloride from the reaction product containing both the sodium chloride and the elemental metal.

The table of the physical properties of metals, as well as the physical properties of the chlorides which are used as starting materials for the present process, is given below:

TABLE

| Metal | | | Starting Chloride | | | |
|---|---|---|---|---|---|---|
| Symbol | Melting Pt., °C. | Boiling Pt., °C. | Formula | Melting Pt., °C. | Boiling Pt., °C. | Phase for Reduction |
| Ti | 1,730 | 3,250 | $TiCl_4$ | −23 | 136 | Liquid or gas. |
| Zr | 2,130 | 3,580 | $ZrCl_4$ | 437 | 331 (sublimes) | Solid or dilute gas. |
| Hf | 2,330 | 5,200 | $HfCl_4$ | 432 | 317 (sublimes) | Do. |
| Th | 1,830 | 4,200 | $ThCl_4$ | 765 | 922 | Solid. |
| V | 1,700 | 3,400 | $VCl_4$ | −26 | 148 | Liquid or gas. |
| Cb | 2,415 | 5,100 | $CbCl_5$ | 212 | 243 | Solid, liquid, or gas. |
| Ta | 3,000 | 6,000 | $TaCl_5$ | 207 | 234 | Do. |
| Cr | 1,900 | 2,200 | $CrCl_3$ | 1,150 | 950 (sublimes) | Solid. |
| Mo | 2,620 | 3,700 | $MoCl_5$ | 194 | 268 | Solid, liquid, or gas. |
| W | 3,370 | 5,900 | $WCl_6$ | 275 | 337 | Do. |
| U | 1,132 | 3,530 | $UCl_5$ | Sublimes | 618 | Solid or dilute gas. |

The reaction conditions, as well as the method of carrying out the reaction, will depend, as indicated in the above table, upon the starting material employed. When, for example, the chloride of the metal to be recovered exists at ordinary temperatures in liquid form, such as is the case with titanium tetrachloride, and vanadium tetrachloride, the liquid metal compound may be introduced into a stirred pool of sodium amalgam either from above or below the surface of the liquid amalgam. Intimate contact of the reactants can also be effected by bubbling the liquid compound through a long column of liquid sodium amalgam.

Another method of mixing the reactants when the compound to be reacted is normally in liquid state consists in running a jet of the finely dispersed, partially vaporized liquid compound into a jet of finely divided liquid sodium amalgam. Since the quantity of sodium amalgam involved will be much more than the quantity of the metallic halide, the relative proportions of the ingredients entering the reaction zone may be controlled by using the amalgam as a pumping fluid. Through proper arrangement of jets and nozzles, the amalgam can pump the desired amount of metallic compound into the reaction zone in venturi or aspirator fashion.

The various metals which may be recovered by the process of the present invention may be grouped into classes whose members have similar properties in elemental and chloride forms. Such classes would include (1) titanium and vanadium, (2) zirconium and hafnium, (3) columbium and tantalum, and (4) molybdenum and tungsten.

Where the metallic compound can be readily vaporized, as in the case of titanium tetrachloride, vanadium tetrachloride, sublimed zirconium tetrachloride, or hafnium tetrachloride, the vapors of the metallic compound can be bubbled through an agitated pool of the sodium amalgam.

In the case of sublimed zirconium tetrachloride and sublimed hafnium tetrachloride, these compounds are most easily introduced by dilution with an inert gas.

Where the metallic compound to be used as the starting material is in solid form, the compound is preferably introduced into a vigorously agitated supply of sodium amalgam in the form of very fine particles on the order of one micron in dimension. It is also possible to introduce the solid compound in finely divided form into a flowing stream of liquid amalgam before introduction of the amalgam into the reaction zone to insure intimate contact between the reactants.

A wide range of sodium content in the amalgam is permissible within the practice of the present invention. Mercury and sodium form a series of inter-metallic compounds having varying melting points. The melting point of sodium-mercury mixture rises rapidly up to a sodium concentration of about 5% and then decreases as the sodium concentration increases to about 27%. At increasing sodium concentrations above 27%, the melting point rises steadily. At a sodium concentration of 0.35% by weight, the amalgam has a melting point of —48°. As the concentration of sodium is increased to 5.2% the melting point is raised to 355° C. At a sodium concentration of 22.28%, representing the compound $Hg_2Na_5$, the melting point is 66° C. Apparently, the last compound is formed at a sodium concentration of 27% and corresponds to the formula $HgNa_3$. This composition has a melting point of about 60° C.

While any of the sodium-mercury mixtures up to high concentrations of sodium can be used, we have found it preferable to employ those amalgams which have melting points below about 180° C. Accordingly, we prefer to use sodium amalgams having a concentration of about 0.05% to 2.5% or from 10% to 50% sodium by weight to facilitate handling of the amalgams and to reduce the temperature required in reaction zone. Above a sodium concentration of 50% by weight, the cost of preparing such amalgams does not justify their use from an economic point of view since equivalent results can be obtained from amalgams of lower sodium concentration at lower temperatures.

Sodium amalgams of relatively low concentration are commercially available as by-products in the manufacture of caustic soda by the use of the mercury-chlorine cell. The latter is an electrolytic cell in which sodium-mercury amalgam and chlorine are produced by the electrolysis of a brine solution between a moving mercury cathode and graphite anodes. The two most common cells are known as the "rocking" and "stationary" types. A chlorine cell of either type can advantageously be used in conjunction with the process of reducing refractory metal compounds, since the chlorine liberated during the reaction can be used in the chlorination of the oxides of the metal to produce the corresponding chlorides. Conventional mercury-chlorine cells usually produce an amalgam having a concentration of less than 0.5% sodium. Where amalgams of higher sodium concentration are to be produced, metallic sodium is added to the relatively dilute amalgam prepared in mercury-chlorine cell in the proper proportion to form the desired amalgam. In addition, amalgams of high sodium concentration can be prepared by distilling mercury from a dilute amalgam or by electrolyzing a given amalgam in a secondary cell so that the sodium content is increased.

In the accompanying flow diagram, we have illustrated a general flow sheet for the recovery of metals in groups IV-A, V-A and VI-A of the periodic system.

The first step illustrated in the drawing is the preparation of the amalgam in the "amalgam make-up" zone. This zone may include a mercury-chlorine type cell, or other means for producing an amalgam of the desired sodium concentration.

The sodium amalgam prepared in the make-up zone is next transferred to a reactor zone where it is reacted with a halide, and preferably a chloride of the metal (Me), to be recovered. In the drawing, the chloride has been designated as $Me_xCl_y$, where $x$ and $y$ are integers.

As previously described, the reaction between the metal halide and the sodium amalgam can be carried out with the metal halide in solid, liquid or gaseous phase. The temperatures and pressure in the reaction zone should be such that the mercury of the amalgam is maintained below its boiling point. Since the presence of sodium decreases the vapor pressure of mercury, the boiling point of the system is substantially higher than the boiling point of pure mercury under the same pressure. We have found that for best results the pressures and temperatures should be so correlated in the reaction zone so as to maintain the vapor pressure of mercury over the system at a value of less than 100 millimeters.

The reaction temperature will depend to a large extent upon the reactivity of the metal halide introduced into the reaction zone. Where liquid halides such as titanium tetrachloride and vanadium tetrachloride are used, slightly elevated temperatures in the range from about 100° to about 200° C. will be employed. For metallic halides having high melting points, higher temperatures on the order of 200° C. to the boiling point of the amalgam may be employed.

The reaction between the metallic halide and sodium amalgam in the reactor is carried out substantially at atmospheric pressures, although superatmospheric and subatmospheric pressures may also be employed. To prevent contamination of the products with air or other gases, the reaction is carried out in an atmosphere of an inert gas such as argon, helium, neon, krypton, or the like.

The proportion of the reactants in the reaction zone controls the nature and the ratio of the various products produced. In the practice of the present invention an amount of sodium amalgam to provide an excess of sodium over that theoretically required to reduce the chloride to the elemental metal will be employed. However, if the reduction is to be controlled to produce sub-halides of the metal in appreciable quantities, the amount of sodium amalgam will be correspondingly reduced.

The reaction in which the metallic compound is reduced by the sodium amalgam proceeds smoothly without violence and is completed in a short period of time.

The reaction product may contain the elemental metal, together with incompletely reduced halides of the metal. In the accompanying diagram these incompletely reduced halides have been designated as $Me_mCl_n$. The reaction product also includes sodium chloride and residual mercury.

The reaction product may exist in the form of a finely divided powder which floats upon the surface of the mercury or the amalgam. With some metals the reaction product takes the form of a viscous liquid phase which stratifies from the liquid body of amalgam after settling.

The mercury or spent amalgam in the reaction product may be drained or filtered off by any well known gravity separation means, such as by the use of a gold seal type filter. Alternatively, the mercury may be expressed from the reaction product and the sodium chloride drained from the product in the same apparatus. For a description of a suitable apparatus and method for recovering mercury and sodium chloride from such a reaction product, reference is made to an application of Gerald G. Hatch, Serial No. 165,346, filed May 31, 1950, now Patent No. 2,676,882, dated April 27, 1954.

The mercury recovered from the reaction product may be recycled to the amalgam make-up zone as indicated on the drawing.

After removal of the major portion of mercury present in the reaction product, this product is next treated for the removal of sodium chloride and any sub-halides of the metal which have been formed in the reduction. To accomplish this separation, the reaction product may be transferred, without exposing the same to air, to a separating and agglomerating furnace. This furnacing system is operated under non-oxidizing conditions, preferably in the presence of a rare gas such as argon, helium, neon, krypton, or the like, or under vacuum. Where vacuum is used, the pressure should be less than about 0.01 millimeter and preferably on the order of about 0.001 millimeter or less.

To remove any residual mercury left behind from the mercury removal step, the furnace is first maintained at a temperature in the range from about 300° to 700° C. After the mercury has been distilled off, the remaining product containing sodium chloride, refractory metal and any sub-halides of the metal is heated in a non-oxidizing atmosphere, for example, under a vacuum of 0.001 millimeter or less to a temperature of about 800° C., and preferably from 800° C. to 1000° C., to volatilize the sodium chloride. Alternatively, molten sodium chloride can be drained off at temperatures above its melting point.

When the reduced metal products are furnaced in the presence of sodium chloride, it has been found that the particles agglomerate into relatively large crystals which are stable in air, water and acid. These agglomerates have a crystal size on the order of about 0.01 to 0.1 millimeter in maximum dimension and may be easily handled for subsequent melting or alloying operations. The crystals of metal thus produced may also be sintered and compressed into coherent masses, using ordinary powder metallurgy techniques.

Instead of removing sodium chloride by the furnacing operation described above, sodium chloride may also be removed by compressing the reaction mixture containing the elemental metal including sodium chloride into a rod and using this rod as a consumable electrode in an arc melting process. For the details of this operation, reference is made to an application of Gerald G. Hatch, Serial No. 165,347, now abandoned, assigned to the same assignee as the present invention.

While the foregoing description is primarily concerned with the reduction of a higher halide to the elemental metal, the process of the invention can also be carried out in a series of stages involving partial reduction of a higher halide of the metal to a lower halide, followed by reduction of the lower halide to the elemental metal. In the first step of such a process, for example, a tetrachloride of the metal may be reduced to the dichloride form by using milder conditions of temperature, less agitation, and lower sodium concentrations in the amalgam. In the second stage, the dichloride produced may be reduced to the elemental metal with a fresh batch of amalgam, either at the concentration of the original amalgam, or, preferably, with an amalgam having a higher sodium concentration.

The following examples illustrate the method employed in the present invention:

Example I

In this run, 146 cc. of titanium tetrachloride having a specific gravity (at 20° C.) of 1.73 were introduced in liquid form beneath the surface of a liquid pool of 54 pounds of a sodium amalgam containing 0.794% by weight sodium. The titanium tetrachloride was introduced at the rate of 4.3 cc. per minute into the vigorously agitated pool of amalgam maintained in the reactor at a temperature of 140° C. The amalgam recovered from the process contained 0.451% sodium. The mercury remaining in the reaction product was distilled off in an argon atmosphere at 600° C. for a period of 16 hours. Sodium chloride was volatilized by treatment under an absolute pressure of 0.2 micron of mercury at a temperature of 800° to 900° C. for a period of 2 hours. The titanium metal recovered represented 88% of the titanium introduced as titanium tetrachloride.

Example II

A 20% amalgam was prepared by mixing 1600 grams of sodium with 6400 grams of mercury. The amalgam was reacted with 80 cc. of titanium tetrachloride introduced during a period of 40 minutes, while maintaining the reaction zone at a temperature of 140° C. An analysis of the product leaving the reactor showed that the reaction product consisted essentially of pure titanium, with no excess of chlorine and no sub-chlorides of titanium.

Example III

Powdered zirconium tetrachloride of a particle size of about 1 micron was dispersed in a liquid sodium amalgam having a Na concentration of 1% as the amalgam was being pumped into a reaction vessel maintained at a temperature of about 200° C. The reaction was carried out in an atmosphere of helium at atmospheric pressure with vigorous agitation. The reaction product was a powdery mass which floated on the surface of the amalgam. After removal of mercury by distillation, the reaction product was analyzed for zirconium and was found to contain, as metallic zirconium, approximately 75% of the zirconium originally introduced as $ZrCl_4$.

Example IV

The reaction as above described was carried out with the use of powdered hafnium tetrachloride. A sodium amalgam having a 2% sodium content was used for the reaction. The same conditions of temperature and pressure were used as in the previous example. The reaction product was found to contain a metallic hafnium content of approximately 70% of the available hafnium originally present in the hafnium tetrachloride.

Example V

Powdered thorium tetrachloride having a particle size of 1 micron or less was introduced into a liquid supply of sodium amalgam having a sodium concentration of 1.2% by weight. The reaction zone was maintained at a temperature of about 250° C. and in an argon atmosphere. The phase containing the reaction products was found to contain an amount of metallic thorium representing approximately 75% of the original thorium introduced as $ThCl_4$.

Example VI

A sodium amalgam was prepared having a sodium content of 50%. Liquid vanadium tetrachloride was introduced beneath the surface of the sodium amalgam in a reactor maintained at a temperature of 135° C. while vigorously agitating the amalgam. The reaction product had a metallic vanadium content of about 80% of the available vanadium present in the original vanadium tetrachloride.

Example VII

Gaseous tantalum pentachloride was introduced into a vigorously agitated bath of a 1% sodium amalgam maintained at a temperature of about 250° C. and in a helium atmosphere. After removal of mercury the reaction product was analyzed and found to contain a metallic tantalum content representing about 75% of the tantalum originally introduced as the pentachloride.

Metallic columbium may be recovered in the manner described in Example VII, using columbium pentachloride as the starting material.

Example VIII

Solid particles of chromium trichloride were introduced beneath the surface of a liquid pool of 70 pounds of a sodium amalgam containing 0.9% sodium. The amalgam was maintained at a temperature of 200° C. in an atmosphere of helium under vigorous agitation. The reaction mass was removed from the surface of the liquid amalgam and heated to volatilize mercury. The remaining mixture contained metallic chromium in an amount approximately 90% of the chromium content of the $CrCl_3$ originally present.

Example IX

Liquified molybdenum pentachloride was dispersed in an agitated liquid body of a sodium amalgam containing 0.8% sodium by weight. A temperature of 200° C. in an inert atmosphere of argon at atmospheric pressure was employed. The molybdenum recovered from the reaction products represented a yield of approximately 75%.

Metallic tungsten and uranium can also be recovered by the procedure described in Example VIII by using the appropriate halides of these metals.

From the foregoing it will be appreciated that we have herein provided a new method for the recovery of refractory metals in groups IV-A, V-A and VI-A of the periodic system. One of the characteristic features of the process is the use of a reducing agent in the form of a liquid, which insures intimate contact between the reducing agent and the compound to be reduced, as well as simplifying the problems of heat transfer. The reaction with the amalgam may be carefully controlled, and proceeds without violence at lower temperatures than heretofore have been thought possible for the reduction of such compounds.

It will be understood that modifications and variations may be effected without departing from the scope of the novel concepts of the present invention.

We claim as our invention:

1. The method of recovering the elemental metal from a halide of a metal selected from the group consisting of zirconium, hafnium, thorium, vanadium, columbium, tantalum, chromium, molybdenum, tungsten and uranium, which comprises vigorously mixing said halide with an alkali metal amalgam in the presence of an inert gas, the alkali metal content of said amalgam being sufficient theoretically to completely reduce said halide to the elemental metal, continuing the vigorous agitation of the reactants until a reaction mass of elemental metal, alkali metal halide, and spent amalgam results, separating the alkali metal halide and spent amalgam from the elemental metal, and recovering the elemental metal.

2. The method of recovering the elemental metal from a halide of a metal selected from the group consisting of zirconium, hafnium, thorium, vanadium, columbium, tantalum, chromium, molybdenum, tungsten and uranium, which comprises vigorously mixing said halide with a sodium amalgam in the presence of an inert gas, the sodium content of said amalgam being sufficient theoretically to completely reduce said halide to the elemental metal, continuing the vigorous agitation of the reactants until a reaction mass of elemental metal, sodium halide and spent amalgam results, separating the sodium halide and spent amalgam from the elemental metal and recovering the elemental metal.

3. The method of recovering the elemental metal from a halide of a metal selected from the group consisting of zirconium, hafnium, thorium, vanadium, columbium, tantalum, chromium, molybdenum, tungsten and uranium, which comprises vigorously mixing said halide with sodium amalgam in the presence of an inert gas, the sodium content of said sodium amalgam being sufficient theoretically to completely reduce said halide to the elemental metal, continuing the vigorous agitation of the reactants until a reaction mass of the elemental metal, sodium halide, subhalides of the elemental metal, and spent amalgam results, removing a substantial amount of mercury from said reaction mass, transferring the remaining reaction mass to a furnacing zone without exposure to the air, heating said remaining reaction mass in said furnacing zone to distill off sodium halide and to decompose sub-halides of the elemental metal present, and recovering as the residue in said furnacing zone crystals of the elemental metal.

4. The method of recovering the elemental metal from a halide of a metal selected from the group consisting of zirconium, hafnium, thorium, vanadium, columbium, tantalum, chromium, molybdenum, tungsten and uranium, which comprises vigorously mixing said halide with sodium amalgam in the presence of an inert gas, the sodium content of said amalgam being sufficient theoretically to completely reduce said halide to the elemental metal, continuing to vigorously agitate the reactants until the reaction mass of the elemental metal, sodium halide, sub-halides of the elemental metal and spent amalgam results, removing a substantial amount of mercury from said reaction mass, transferring the remaining reaction mass to a furnacing zone without exposure to the air, heating said remaining reaction mass in said furnacing zone to a temperature of at least 800° C. under vacuum conditions to separate sodium halide and to decompose sub-halides of the elemental metal present, and recovering as the residue in said furnacing zone crystals of the elemental metal.

5. The method of recovering the elemental metal from a halide of a metal selected from the group consisting of zirconium, hafnium, thorium, vanadium, columbium, tantalum, chromium, molybdenum, tungsten and uranium, which comprises vigorously mixing said halide with sodium amalgam in the presence of an inert gas, the sodium content of said sodium amalgam being sufficient theoretically to completely reduce said halide to the elemental metal, continuing to vigorously agitate the reactants until the reaction mass of the elemental metal, sodium halide, sub-halides of the elemental metal and spent amalgam results, removing a substantial amount of mercury of said reaction mass, transferring the remaining reaction mass to a furnacing zone without exposure to the air, heating said remaining reaction mass in said furnacing zone to a temperature of between about 800° C. and 1000° in a non-oxidizing atmosphere to remove at least a portion of the sodium halide and decompose sub-halides of the elemental metal present, and further heating the remaining mixture containing the elemental metal and residual sodium halide to a sufficiently high temperature to volatilize said residual sodium halide and to melt said elemental metal.

6. The method of recovering the elemental metal from a halide of a metal selected from the group consisting of zirconium, hafnium, thorium, vanadium, columbium, tantalum, chromium, molybdenum, tungsten and uranium, which comprises vigorously mixing said halide with a sodium amalgam containing between .05 and 2.5% by weight sodium in the presence of an inert gas, the sodium content of said amalgam being sufficient theoreticaly to completely reduce said halide to the elemental metal, continuing the vigorous agitation of the reactants until a reaction mass of elemental metal, sodium halide, and spent amalgam results, separating the sodium halide and spent amalgam from the elemental metal and recovering the elemental metal.

7. The method of recovering elemental vanadium from a vanadium chloride, which comprises vigorously mixing the vanadium chloride with sodium amalgam in the presence of an inert gas, the sodium content of said sodium amalgam being sufficient theoretically to completely reduce the vanadium chloride to vanadium, continuing to vigorously agitate the reactants until a reaction mass of elemental vanadium, sodium chloride and spent amalgam results, separating the sodium chloride and spent amalgam from the vanadium and recovering elemental vanadium.

8. The method of producing elemental zirconium from a zirconium chloride which comprises vigorously mixing the zirconium chloride with sodium amalgam in the presence of an inert gas, the sodium content of said sodium amalgam being sufficient theoretically to completely reduce said zirconium chloride to zirconium, continuing to vigorously agitate the reactants until a reaction mass of elemental zirconium, sodium chloride and spent amalgam results, separating the sodium chloride and spent amalgam from the zirconium, and recovering elemental zirconium.

9. The method of recovering elemental molybdenum from a molybdenum chloride which comprises vigorously mixing said molybdenum chloride with sodium amalgam in the presence of an inert gas, the sodium content of said sodium amalgam being sufficient theoretically to completely reduce said molybdenum chloride to molybdenum, continuing to vigorously agitate the reactants until a reaction mass of elemental molybdenum, sodium chloride and spent amalgam results, separating the sodium chloride and spent amalgam from the molybdenum, and recovering elemental molybdenum.

10. The method of producing tungsten from a tungsten chloride which comprises vigorously mixing said tungsten chloride with sodium amalgam in the presence of an inert gas, the sodium content of said sodium amalgam being sufficient theoretically to completely reduce said tungsten chloride to tungsten, continuing to vigorously agitate the reactants until a reaction mass of elemental tungsten, sodium chloride and spent amalgam results, separating the sodium chloride and spent amalgam from the tungsten and recovering elemental tungsten.

11. The method of producing elemental columbium from a columbium chloride which comprises vigorously mixing said columbium chloride with sodium amalgam in the presence of an inert gas, the sodium content of said sodium amalgam being sufficient theoretically to completely reduce said columbium chloride to columbium, continuing to vigorously agitate the reactants until a reaction mass of elemental columbium, sodium chloride and spent amalgam results, separating the sodium chloride and spent amalgam from the columbium and recovering elemental columbium.

References Cited in the file of this patent

UNITED STATES PATENTS

| | | |
|---|---|---|
| 2,556,763 | Maddex | June 12, 1951 |
| 2,564,337 | Maddex | Aug. 14, 1951 |
| 2,618,549 | Glasser et al. | Nov. 18, 1952 |
| 2,618,550 | Hampel et al. | Nov. 18, 1952 |
| 2,676,882 | Hatch | Apr. 27, 1954 |

FOREIGN PATENTS

| | | |
|---|---|---|
| 296,867 | Germany | Mar. 13, 1917 |

OTHER REFERENCES

Dictionary of Applied Chemistry, by Thorpe, vol. 5, published 1916 by Longmans, Green and Co., New York; pages 5 and 6.

Comprehensive Treatise on Inorganic and Theoretical Chemistry, by Mellor, vol. 7, published 1927 by Longsmans, Green and Co., 55 Fifth Ave., New York; pages 9 and 11.

Chemical Engineering Progress, September 1950; page 454.

Dictionary of Applied Chemistry, by Thorpe, 4th ed., published 1950 by Longsmans, Green & Co., N. Y., vol. 10, pages 810 and 811.